United States Patent [19]

Newlin et al.

[11] Patent Number: 5,636,211

[45] Date of Patent: Jun. 3, 1997

[54] UNIVERSAL MULTIMEDIA ACCESS DEVICE

[75] Inventors: Douglas J. Newlin, Winfield; Charles P. Richardson, Barrington, both of Ill.

[73] Assignee: Motorola, Inc., Schaumburg, Ill.

[21] Appl. No.: 515,345

[22] Filed: Aug. 15, 1995

[51] Int. Cl.$^6$ ........................................... H04L 5/00
[52] U.S. Cl. ........................................ 370/465; 364/514 A
[58] Field of Search ................................. 370/17, 18, 50, 370/60, 60.1, 94.1, 94.2, 110.1; 364/514 A

[56] References Cited

U.S. PATENT DOCUMENTS 5,384,777  1/1995  Ahmadi et al. ........................ 370/110.1

*Primary Examiner*—Melvin Marcelo
*Attorney, Agent, or Firm*—Bruce E. Stuckman

[57] ABSTRACT

A universal multimedia access apparatus for accessing any of a plurality of multimedia applications provided by a multimedia network. The universal multimedia access apparatus accesses a predetermined one of the plurality of multimedia applications using an application-specific module interfaced thereto, the application-specific module being selected from a plurality of application-specific modules. The universal multimedia access apparatus comprises a transceiver and a processing unit. The transceiver communicates multimedia information between the multimedia network and the application-specific module, and communicates with the multimedia network in any one of a plurality of communication modes. The processing unit is operative to identify the application-specific module interfaced thereto and the predetermined one of the plurality of multimedia applications associated with the application-specific module, and operative to command the transceiver to communicate with the multimedia network in a mode associated with the predetermined one of the plurality of multimedia applications.

20 Claims, 8 Drawing Sheets

5,636,211

UNIVERSAL MULTIMEDIA ACCESS DEVICE

FIELD OF THE INVENTION

The present invention relates to methods and systems for providing access to a multimedia network.

BACKGROUND OF THE INVENTION

There are known approaches to providing access to a multimedia network which utilize a centralized, fixed set-top box. Some approaches currently being explored utilize a hybrid analog-digital cable system. These approaches are disadvantageous in that they do not scale easily or support diverse applications. For example, for these approaches to add additional capability in the home, multiple set-top boxes are deployed. This results in an expensive and segregated solution to providing diverse multimedia applications.

Further, many prior art systems do not support high speed upstream traffic, and hence, are not amenable to key bidirectional services such as video teleconferencing from the home. Also, some prior art units are restricted for use with a home personal computer. As a result, these units are not amenable to non-PC applications such as alternative phone service, energy management, and home security.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Embodiments of the present invention advantageously provide a portable, universal multimedia access apparatus which can be used for diverse multimedia applications delivered via a multimedia network. Each multimedia application can be supported independently of the other multimedia applications, and independent of a set-top box or a personal computer server. Embodiments of the universal multimedia access apparatus support applications including, but not limited to, high-speed data access (e.g. Internet access), alternative phone service, energy management, home security, home banking, and video.

Figure 1:
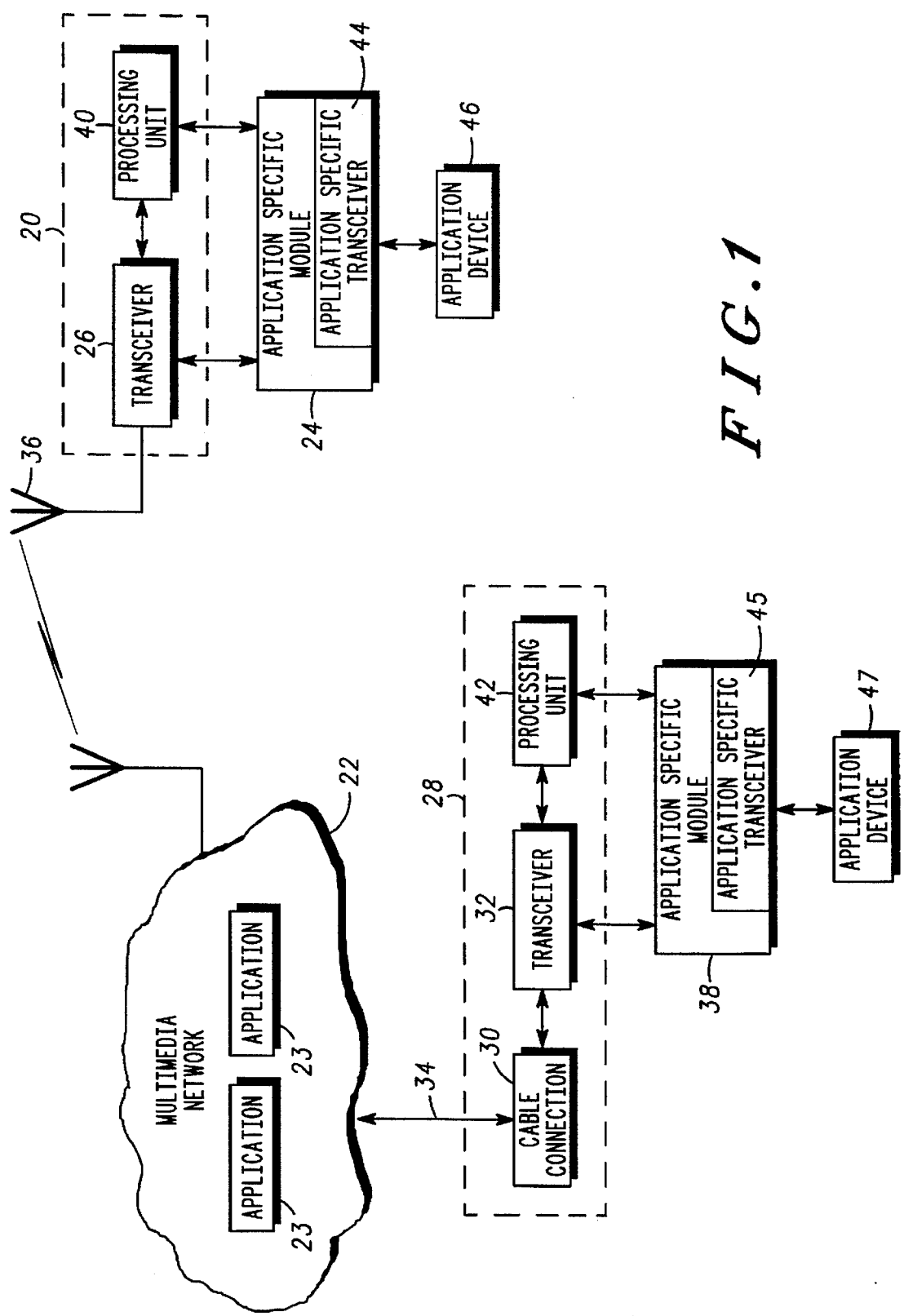
FIG. 1 is a block diagram illustrating a universal multimedia access apparatus in accordance with embodiments of the present invention.

FIG. 1 is a block diagram illustrating a universal multimedia access apparatus 20 in accordance with embodiments of the present invention. The universal multimedia access apparatus 20 communicates with a multimedia network 22 capable of providing a plurality of multimedia applications 23. The universal multimedia access apparatus 20 accesses a predetermined one of the plurality of multimedia applications 23 using an appropriate application-specific module 24 interfaced thereto. The application-specific module 24 is selected from a plurality of application-specific modules, each being utilized for accessing different ones of the plurality of multimedia applications 23.

The universal multimedia access apparatus 20 includes a transceiver 26 for communicating multimedia information between the multimedia network 22 and the application-specific module 24. The transceiver 26 communicates radio frequency signals with the multimedia network 22 either wirelessly or via a wireline.

In a wireline embodiment of a universal multimedia access apparatus 28, a connector 30 is included for connecting a transceiver 32 to the multimedia network 22 via a cable 34. In a preferred wireline embodiment, the universal multimedia access apparatus 28 includes a 75 ohm coaxial cable connector for connecting the transceiver 32 to the multimedia network 22 via a 75 ohm coaxial cable.

In a wireless embodiment of the universal multimedia access apparatus 20, the transceiver 26 is coupled to an antenna 36 which functions as an RF radiating element. The antenna 36 may be either an extendible/retractable antenna or a fixed-length antenna.

Using either the wireline embodiment or the wireless embodiment, the transceivers 26 and 32 function to transmit and receive RF signals associated with the predetermined one of the plurality of multimedia applications specified by the application-specific modules 24 and 38.

Preferably, the transceivers 26 and 32 are capable of communicating with the multimedia network in any one of a plurality of communication modes.

The universal multimedia access apparatus 20 further includes a processing unit 40 in communication with the transceiver 26 and the application-specific module 24. The processing unit 40 identifies the application-specific module 24 interfaced to the universal multimedia access apparatus 20, and determines the predetermined one of the plurality of multimedia applications 23 associated with the application-specific module 24. The processing unit 40 then commands the transceiver 26 to communicate with the multimedia network 22 in a mode associated with the predetermined one of the plurality of multimedia applications 23.

In a similar manner, the wireline embodiment of the universal multimedia access apparatus 28 includes a processing unit 42 in communication with the transceiver 32 and the application-specific module 38.

The application-specific modules 24 and 38 each include a corresponding application-specific transceiver 44 and 45 for communicating multimedia information with application devices 46 and 47, respectively, coupled thereto. The application-specific modules 24 and 38 each include an interface (not specifically illustrated) for interfacing the application device to the application-specific transceiver. As a result, a two-way exchange of multimedia information occurs between the multimedia network 22 and application devices 46 and 47. This multimedia information can include video signals, data signals, voice signals, audio signals, image signals, and control signals.

A first embodiment of an application-specific module enables the universal multimedia access apparatus to communicate analog voice signals between the multimedia network 22 and a suitable application device such as a telephone. Here, the application-specific transceiver within the application-specific module communicates (i.e. transmits and receives) analog voice signals with the telephone. A suitable telephone network connector, such as an RJ11 connector, is included in the application-specific module to facilitate connection with standard telephones.

A second embodiment of an application-specific module enables the universal multimedia access apparatus to communicate digital computer data between the multimedia network 22 and an application device such as a computer. Here, the application-specific transceiver within the application-specific module communicates (i.e. transmits and receives) digital signals with the computer. A suitable computer network connector, such as a 10BaseT connector, is included in the application-specific module to facilitate connection with a computer in accordance with a network standard (such as Ethernet).

A third embodiment of an application-specific module enables the universal multimedia access apparatus to communicate analog or digital image signals between the multimedia network 22 and an application device. The application device here can either generate image signals (such as a camera or video playback device) or receive image signals (such as a video recording device or a video display device). The application-specific transceiver for this embodiment communicates either analog or digital video signals with the application device. A suitable video connector is included in the application-specific module to facilitate connection with a video application device.

In a fourth embodiment, the application-specific module enables the universal multimedia access apparatus to communicate control signals between the multimedia network 22 and an application device. The application device here can be a home control device or an energy management device, such as an Echelon control device, for example. The application-specific transceiver for this embodiment communicates either analog or digital control signals with the application device. A suitable control connector is included in the application-specific module to facilitate connection with a control application device.

Hence, the universal multimedia access apparatuses are built as a common architectural implementation (hence, universal) based on a multimedia access engine. The multimedia access engine provides a multimedia application programming interface (MMAPI) to diverse applications, while employing an access method to gain access to/from the multimedia network 22. The universal multimedia access apparatuses support both wireless and wireline communications while preserving the common MMAPI.

Each application-specific module has a common first interface for removable "plug-and-play" installation in the universal multimedia access apparatus, and an application-dependent second interface (such as the connectors described above) for connecting and disconnecting appropriate application devices. As a result, the same multimedia access apparatus can be utilized for a wide range of multimedia applications by simply connecting the application-specific module which provides the desired application.

Embodiments of the universal multimedia access apparatus 20 include a suitable housing (not specifically illustrated) comprised of a durable material such as plastic. The universal multimedia access apparatus 20 is powered in accordance with the multimedia application specified by the application-specific module. For example, a power-ringing voltage may be required for an analog phone application, with a different power requirement being utilized for a 10BaseT ethernet application.

Figure 2:
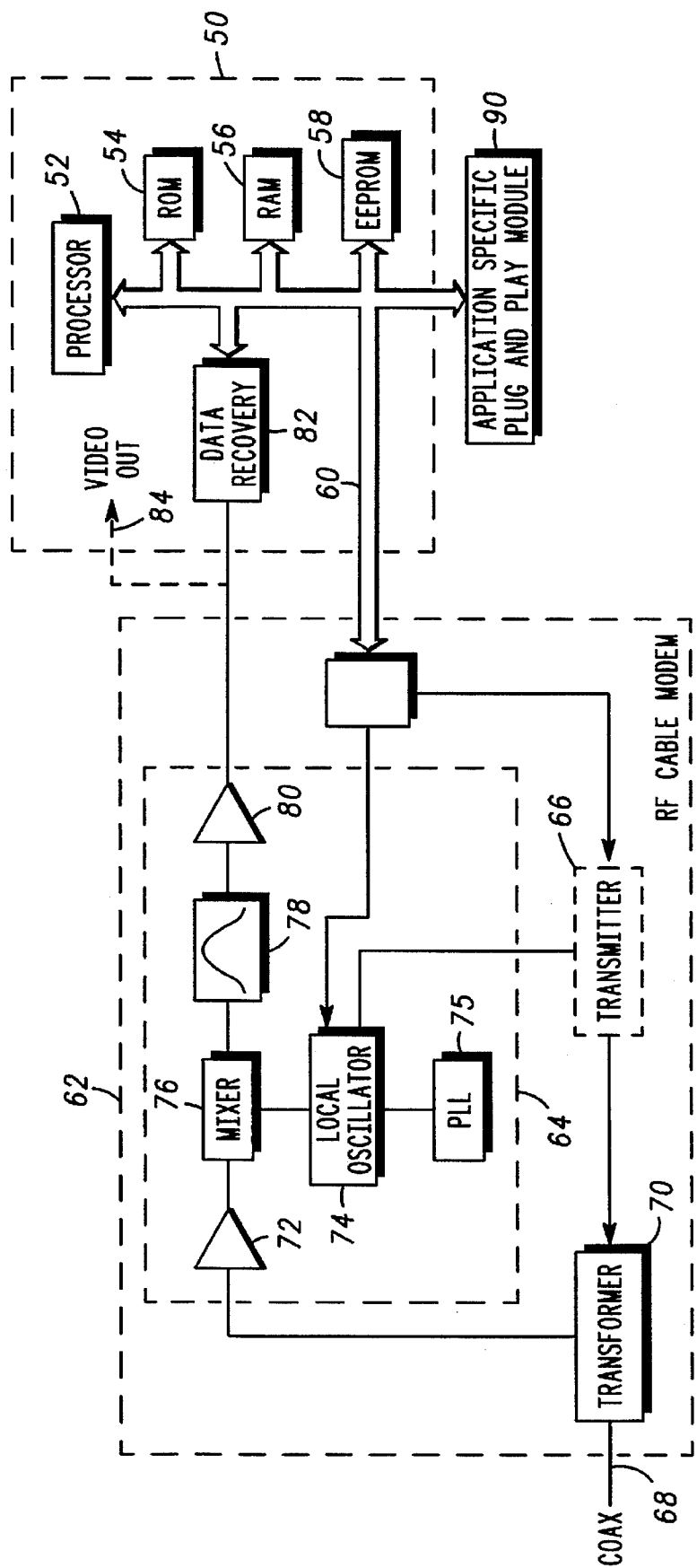
FIG. 2 is a schematic block diagram of an embodiment of the universal multimedia access apparatus.

FIG. 2 is a schematic block diagram of an embodiment of the universal multimedia access apparatus. The apparatus includes a processing unit 50 comprised of a microprocessor 52. The microprocessor 52 is operative to provide a programmable platform for the apparatus. The microprocessor 52 can be selected, for example, from the 68000 series or the PowerPC family of microprocessors which are manufactured by Motorola, Inc.

The microprocessor 52 is coupled to a plurality of memory devices, including a read-only memory (ROM) 54, a random-access memory (RAM) 56, and an electrically erasable programmable read-only memory (EEPROM) 58. Typically, the ROM 54 is utilized to provide a non-volatile means for storing the operating program and utilities accessed by the microprocessor 52. The RAM 56 is typically utilized during operation of the apparatus to store session data. The EEPROM 58 is used to retain dynamically changing data having an expected useful lifetime long than a single operating session. The microprocessor 52 is coupled to the ROM 54, the RAM 56, and the EEPROM 58 by a data and control bus 60.

The microprocessor 52 is coupled to a radio frequency (RF) modem 62 which functions as a transceiver for communicating with the multimedia network 22. The RF modem 62 includes a receiver 64 and a transmitter 66 operative to receive and to transmit appropriately-modulated signals representative of multimedia information with the multimedia network 22. The receiver 64 and the transmitter 66 are controlled by the microprocessor 52 via the data and control bus 60.

The RF modem 62 is illustrated for a wireline embodiment of the present invention, wherein the RF modem 62 is coupled to the multimedia network 22 via a cable plant 68. A transformer 70 is utilized to couple the cable plant 68 to the receiver 64 and the transmitter 66. In a wireless embodiment, however, the receiver 64 and the transmitter 66 are coupled to one or more antennas (not specifically illustrated) to communicate with the multimedia network 22.

The receiver 64 is operative to extract multimedia information contained within a radio frequency signal received thereby. The receiver 64 may include, as shown in FIG. 2., an amplifier 72 which amplifies the radio frequency signal to produce an amplified radio frequency signal, a local oscillator 74 which generates an LO (local oscillator) signal, and a mixer 76 which mixes the amplified radio frequency signal with the LO signal to produce an IF (intermediate frequency) signal. The local oscillator 74 can be produced using a phased-lock loop 75. The receiver 64 further includes a filter 78 which filters the IF signal and a detector/amplifier 80 which produces a demodulated signal representative of the multimedia information.

The demodulated signal is applied to a data recovery unit 82. The data recovery unit 82 is coupled to the microprocessor 52 by the data and control bus 60 to provide the multimedia information to the microprocessor 52. A video out termination 84 is coupled to the output of the receiver 64 to provide external access to the demodulated signal.

The transmitter 66 is commanded to transmit multimedia information signals by the microprocessor 52 via the data and control bus 60. The multimedia information signals are supplied to the cable loop plant 68 via the transformer 70.

The receiver 64 and the transmitter 66 are capable of communicating in any one of a plurality of communication modes, with the specific communication mode employed being commanded by the microprocessor 52 via the data and control bus 60. The specific communication mode is selected in accordance with the application-specific module 90 interfaced to the universal multimedia access apparatus via the data and control bus 60.

The receiver 64 and the transmitter 66 are capable of tuning over a range of frequencies within a predetermined frequency spectrum. Portions of the frequency spectrum can be assigned to a variety of different multimedia applications or services and service providers by the operator of the multimedia network 22. Some services, such as analog television, occupy 6 MHz per information channel, while others require only a fraction of such a channel. Methods for sharing a channel between multiple devices, such as time-division multiple access (TDMA), frequency-division multiple access (FDMA), code-division multiple access (CDMA), and other spread spectrum schemes, or combinations of these may be utilized.

One approach to controlling the transceiver 62 by the processing unit 50 is as follows. Immediately after power-up (and physical connection to a cable in a wireline embodiment), the universal multimedia access apparatus enters an initialization and network connection state. Except for some predetermined services, such as the broadcast of "free" material, a communication protocol between the processing unit 50 and the multimedia network 22 is utilized to initiate and maintain communication between the multimedia access apparatus/application-specific module 90 and the desired service provider.

First, the processing unit 50 identifies the application from an identification signal received from the application-specific module 90. Next, the processing unit 50 commands the transceiver 62 into a predefined mode required by the previously-identified application. In this mode, the transceiver 62 scans the channels to identify applicable services and service providers, thus allowing the universal multimedia access apparatus to identify parameters defined by the network operator. An alternative to scanning is to utilize a preassigned common communication channel for negotiating access to a specific service or application. The transceiver 62 may also scan a subset of channels to identify a channel used for control. As a third step, the universal multimedia access apparatus performs a registration/authentication process via an ESN or equivalent in the EEPROM 58 within the processing unit 50.

Examples of the modulation scheme and bandwidth utilized for various types of communication channels are as follows: FDMA 300 kHz and TDMA 10 slots for voice signals; FDMA, 6 MHz with TDD for data signals; FDMA, 6 MHz for video signals (possibly analog video signals below 450 MHz, possibly digital video signals between 500–750 MHz); and FDMA/TDMA or CDMA for control signals.

Figure 3:
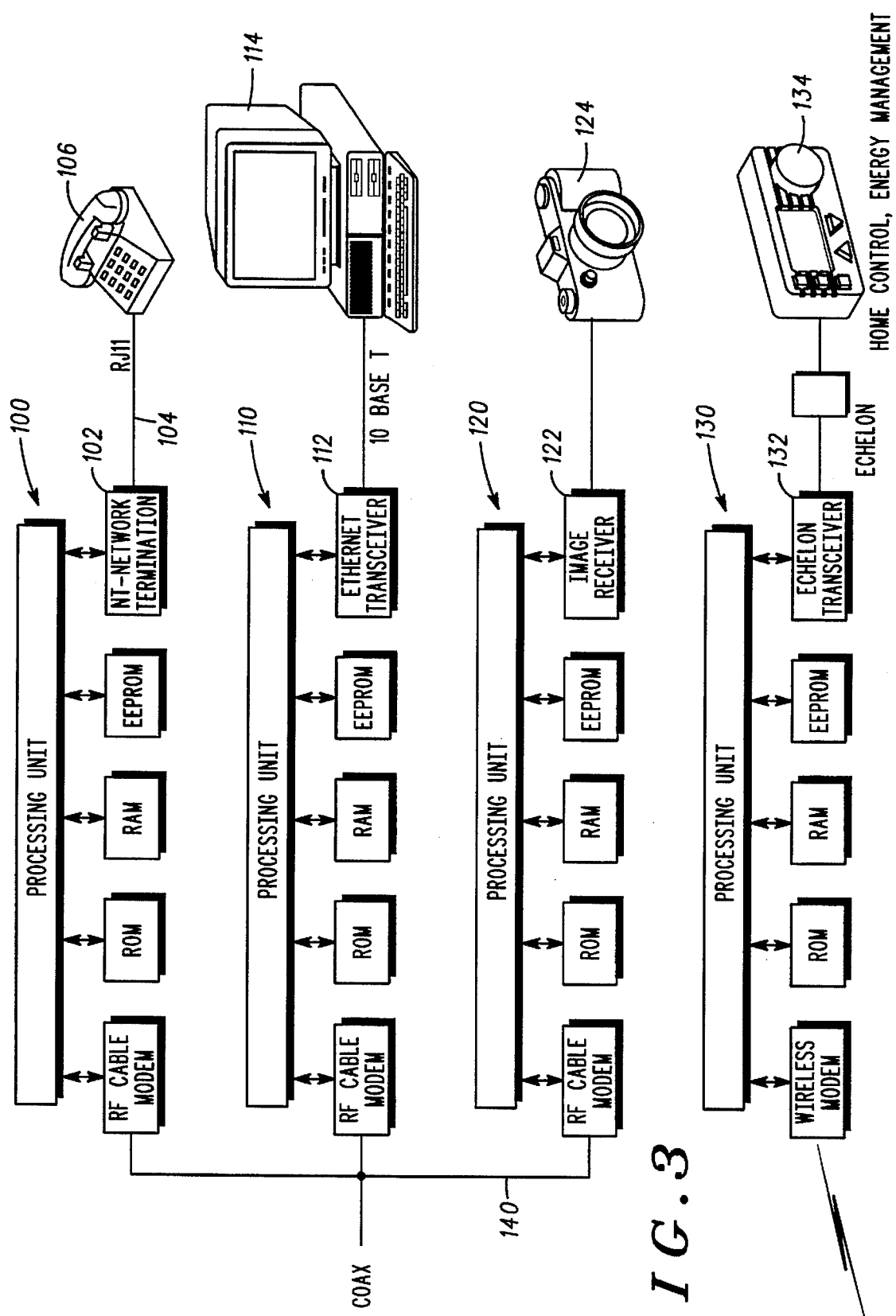
FIG. 3 is a schematic block diagram which illustrates the utilization of the four types of application-specific modules described herein.

FIG. 3 is a schematic block diagram which illustrates the utilization of the four types of application-specific modules described herein. A first universal multimedia access apparatus 100 has a telephone application-specific module 102 interfaced thereto. The telephone application-specific module 102 includes a network termination 104, such as an RJ11 interface, for interfacing with a telephone 106. As a result, the first universal multimedia access apparatus 100 can be utilized to provide an alternative phone service. A variety of different network terminations 104 may be utilized, which include, but are not limited to, ISDN, PBX, and CENTREX.

A second universal multimedia access apparatus 110 has a data application-specific module 112 interfaced thereto. The data application-specific module 112 includes a data transceiver with, for example, an Ethernet 10BaseT interface 114, for sending and receiving data with a computer 114. The second universal multimedia access apparatus 110 can be utilized, for example, to provide high speed data access to the Internet. A variety of different data transceivers may be utilized, which include, but are not limited to, IEEE 802.3 and IEEE 802.5, and FDDI.

A third universal multimedia access apparatus 120 has an image application-specific module 122 interfaced thereto. The image application-specific module 122 includes an image transceiver with, for example, an interface for receiving images from an electronic camera 124 capable of producing a still and/or video image. A variety of different image transceivers may be utilized, which include, but are not limited to, standard NTSC, PAL, or SECAM video cameras, MPEG, JPEG, and other compressed digital image/video standards.

A fourth universal multimedia access apparatus 130 has a control application-specific module 132 interfaced thereto. The control application-specific module 132 includes a control transceiver with, for example, an Echelon interface for sending and receiving control information. The fourth universal multimedia access apparatus 130 can be utilized, for example, in home control and energy management applications. A variety of different control transceivers may be utilized, which include, but are not limited to: Building and Control Network (BACnet), Controller Area Network (CAN), Consumer Electronic Bus (CEBus), General Purpose Interface Bus (GPIB) IEEE-488, Interoperable Systems Project (ISP), Echelon's LonWorks, and World Factory Information Protocol (WorldFIP).

For illustration purposes only, the first, second, and third universal multimedia access apparatuses 100, 110, and 120 are in a wireline configuration, while the fourth universal multimedia access apparatus 130 is in a wireless configuration for communicating with the multimedia network 22. The transceivers in the wireline configuration each constitute an RF cable modem which operates in a predetermined portion of the spectrum of a coaxial cable 140 connected thereto. For example, a bandwidth of 500 MHz, 750 MHz, or higher may be utilized. As described earlier, the RF cable modem includes a transmitter and a receiver for transmitting and receiving appropriately modulated carrier signals. It is noted that a variety of different cable plants can be utilized, including, but not limited to 500 MHz, 750 MHz hybrid digital-analog, and 1 GHz systems.

The transceiver in the wireless configuration constitutes a wireless modem operating in a predetermined portion of the over-the-air spectrum. For example, the band of frequencies allocated for personal communication services (PCS) can be utilized. A variety of wireless platforms can be utilized in this context, including but not limited to 2.4 GHz Local Area Network (LAN), 18 GHz LAN, and 28 GHz LAN.

Figure 4:
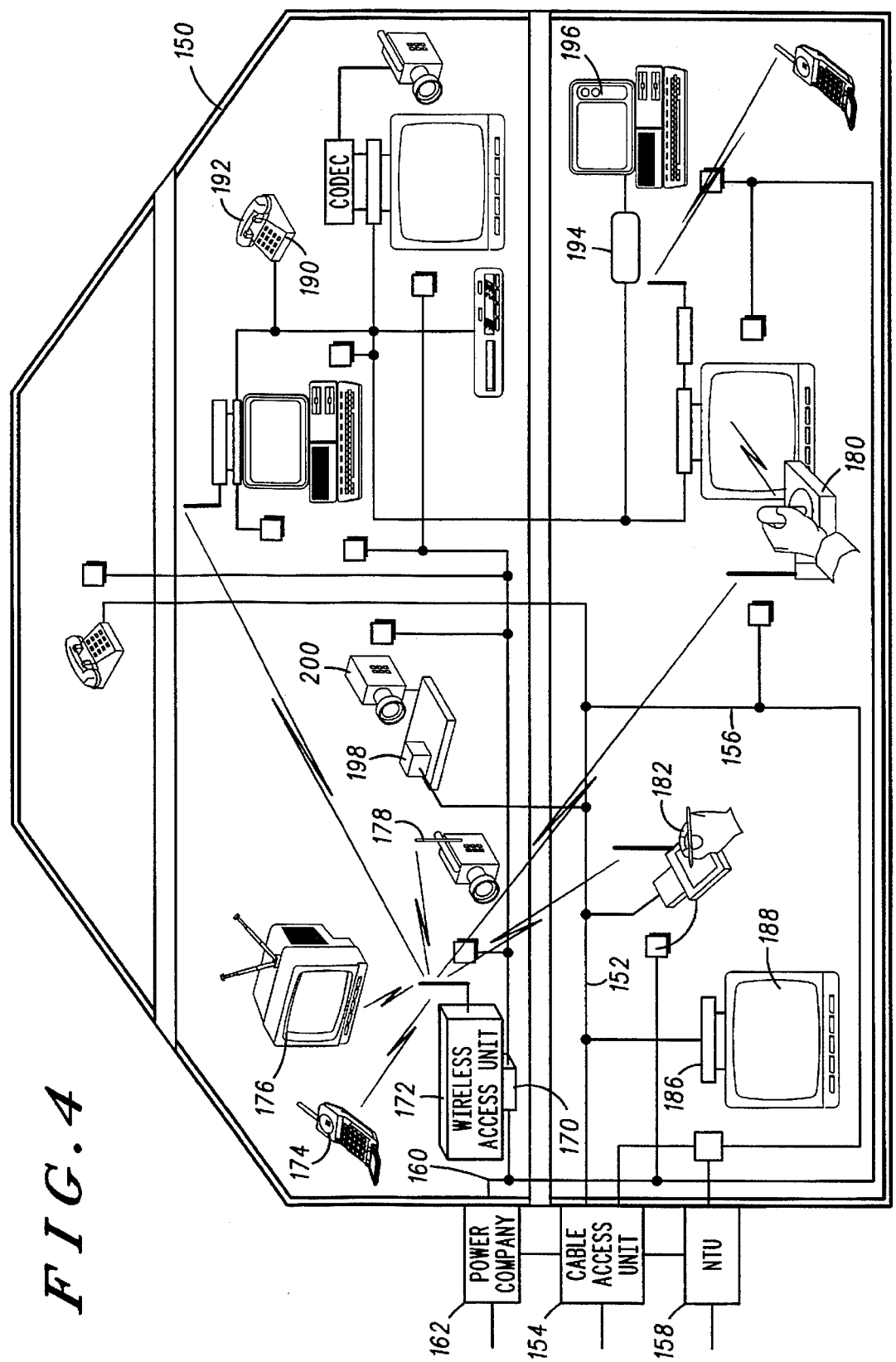
FIG. 4 is a schematic diagram of a scalable and distributed network of universal multimedia access devices within a home.

FIG. 4 is a schematic diagram of a scalable and distributed network of universal multimedia access devices within a home 150. The home 150 includes coaxial cable wiring 152 connected to a cable access unit 154, RJ11 wiring 156 connected to a telephone network termination unit 158, and power wiring 160 connected to a power company 162. A first universal device 170 communicates multimedia information between the cable access unit 154 and an application-specific module interfaced to a wireless access unit 172. The wireless access unit 172 is utilized for wirelessly communicating information with a cordless phone 174, a digital multimedia personal digital assistant 176, a video camera 178, a game controller 180, and a remote controller 182 for communicating control signals. A second universal device 186 communicates multimedia information between the cable access unit 154 and an application-specific module interfaced to a game display unit 188. A third universal device 190 communicates audio information between the cable access unit 154 and a telephone 192. A fourth universal device 194 communicates data signals between the cable access unit 154 and a computer 196. A fifth universal device 198 communicates image signals between the cable access unit 154 and an application-specific module interfaced to a camera 200.

Figure 5:
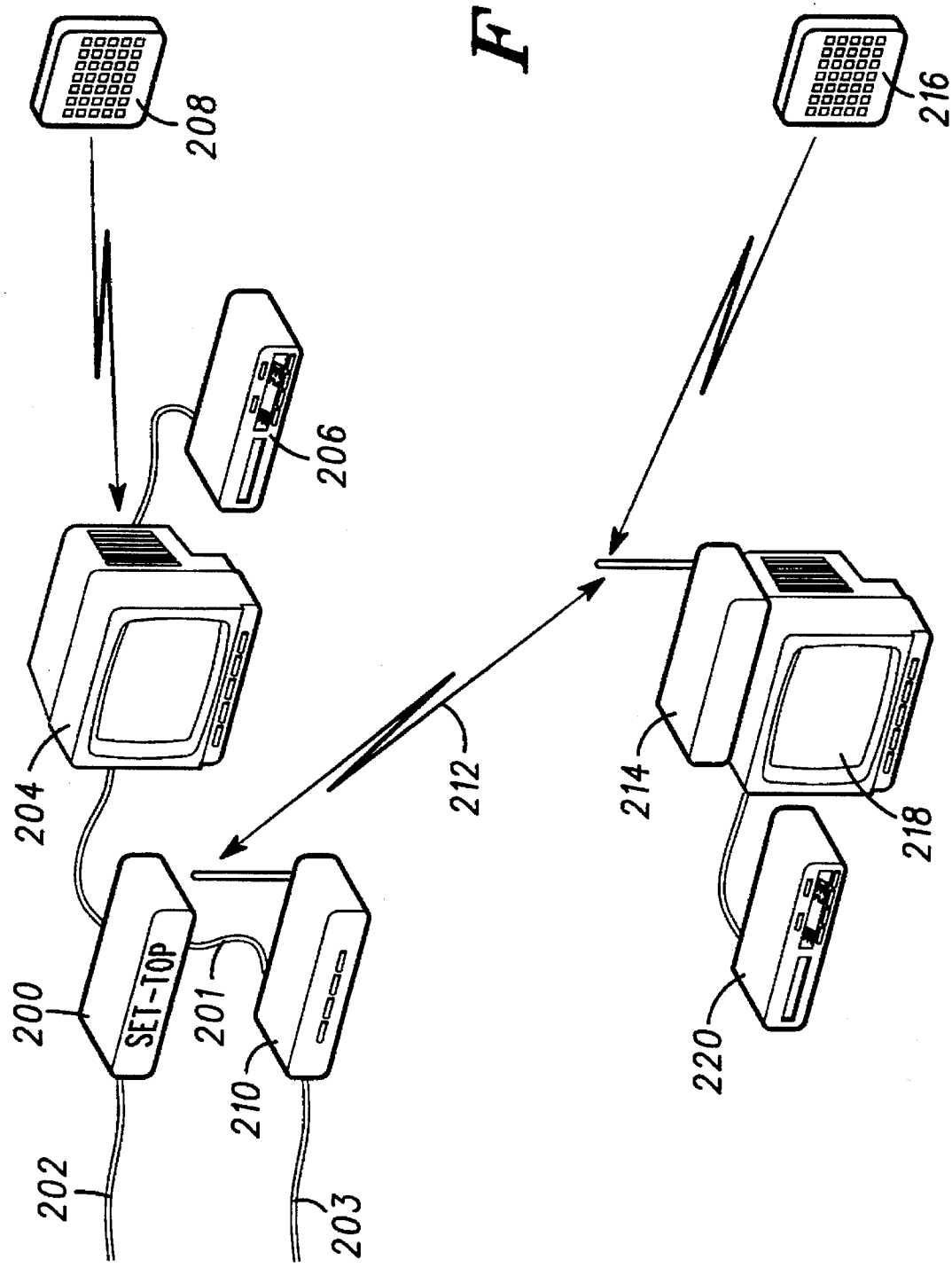
FIG. 5 is a block schematic representation of another embodiment of the present invention. In this embodiment, a universal multimedia access apparatus is included in set-top box 200.

FIG. 5 is a block schematic representation of another embodiment of the present invention. In this embodiment, a universal multimedia access apparatus is included in set-top box 200. A multimedia network is connected to the set-top box 200 via connection 202. Set-top box 200 further includes an application specific module (not shown) that provides video distribution to a first set of application devices in the home. A first application specific transceiver provides wireline distribution of the video signal to a first television (TV) 204 and first video cassette recorder (VCR) 206 being controlled by universal infrared (IR) remote control unit 208.

A second application specific transceiver is implemented by wireless video transmitter 210 in communication with set-top box 200 via signal connection 209 and further in communication with the multimedia network via connection 203. Wireless video transmitter 210 provides wireless distribution of video signals to a second set of application devices in the home via wireless video link 212. The connection of the multimedia network via both connections 202 and 203 allows the second set of application devices access to the network independent of the operation of the set-top box 200. Therefore the first and second sets of application devices can independently acess different multimedia applications simultaneously. Connection 209 is provided to allow the second set of applications access to the full functionalities provided by set-top box 200, if necessary. Wireless video receiver 214, also responsive to universal remote control 216, in turn distributes the video signals to second TV 218 and second VCR 220.

The advantages of this embodiment of the present invention are numerous. The wireless distribution of video signals throughout the home provides easy installation—eliminating the costs of labor intensive wiring of the home. The wireless transmitter-receiver pairs can utilize scrambling or other secure radio transmission techniques to ensure the privacy of video and control signals, thereby eliminating eavesdropping. The wireless transmitter-receiver pairs can further utilize frequency reuse, interference detection and interference mitigation of both the video and control signals. This frequency reuse provides efficient use of the radio frequency (RF) spectrum while protecting neighborhood users from video and control interference. In a further embodiment of the present invention, a single wireless video transmitter 210 can service a plurality of wireless video receivers 214 providing additional flexibility at a lower system cost. In many configurations wireless video transmitter 210 provides application devices with remote access to the set-top box 200.

Figure 6:
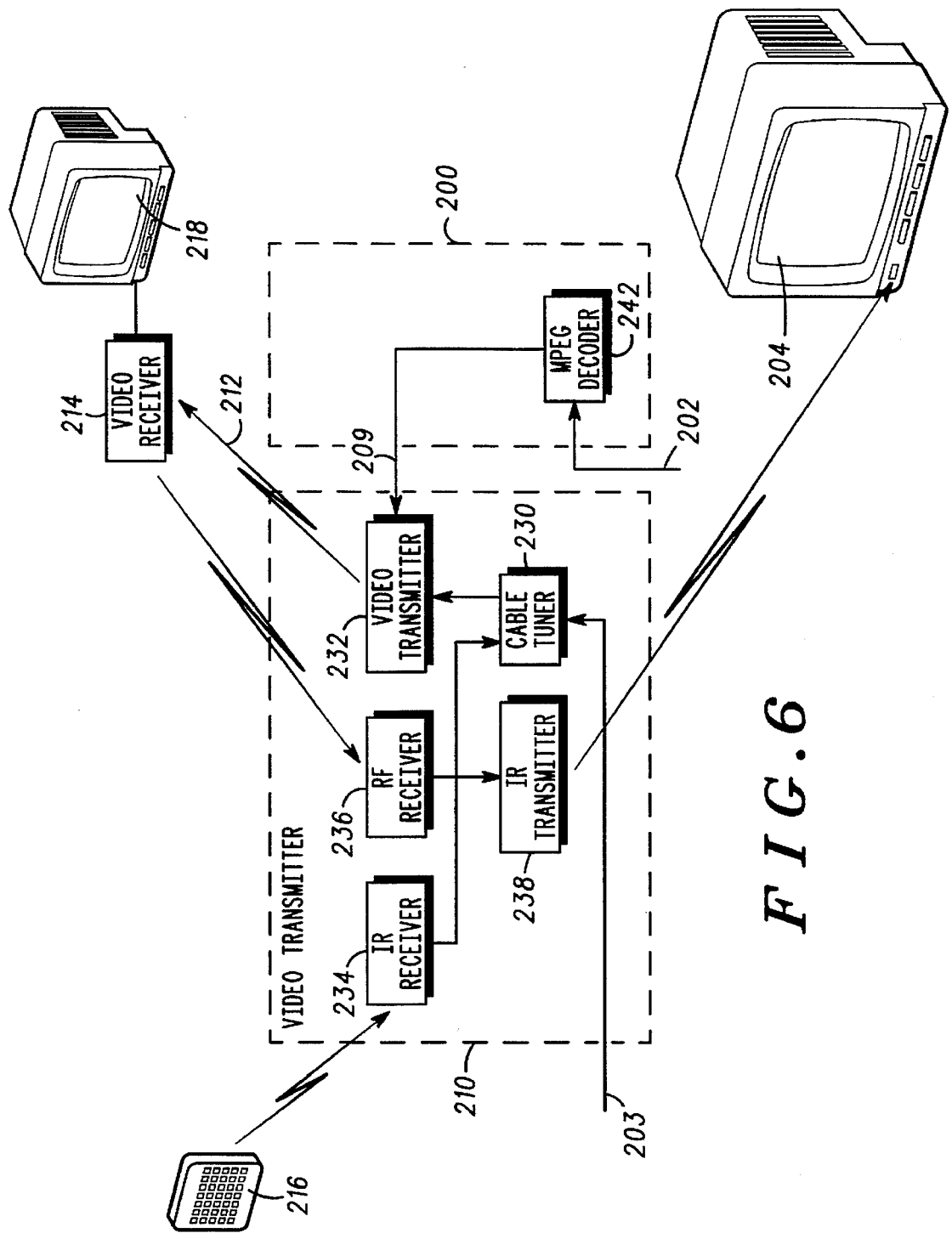
FIG. 6 presents a block diagram representation of a wireless video transmitter used in accordance with an embodiment of the present invention.

FIG. 6 presents a block diagram representation of a wireless video transmitter used in accordance with an embodiment of the present invention. Wireless video transmitter 210 includes cable tuner 230 coupled to signal connection 203 from the multimedia network. The specific tuner selection is controlled directly by universal remote 216 via IR receiver 234, or indirectly by a control signal generated by video receiver 214 and transmitted via an RF signal to RF receiver 236. In addition, a control signal received from either IR receiver 234 or RF receiver 236 can be used to control TV 204 via IR transmitter 238. These control signals can include channel tuning commands and other control information such as "parental control" commands that limit the selection, access, viewing times and cumulative viewing times per day of the video system. Video signals from wireless video transmitter 210 are transmitted to TV 218 by means of video transmitter 232 and wireless video receiver 214.

Wireless video transmitter 210 is coupled to set-top box 200 via connection 209. Set-top box 200 optionally contains a video decompression unit 240 containing a video decompression card such as MPEG decoder 242. While MPEG compression is specifically illustrated, the present invention should be broadly construed to encompass any of the wide range of compression/decompression technologies available. In an additional embodiment of the present invention, set-top box 200 includes a graphical user interface that provides a user with enhanced interface capability for multimedia applications such as shopping, electronic banking, video-on-demand, etc.

While the embodiment of the present invention described above utilizes an RF link from the wireless video receiver 214 to the RF receiver 236 for the purpose of relaying control signals, in an alternative embodiment of the present invention other signals including video signals could be likewise transferred over the link so provided.

Figure 7:
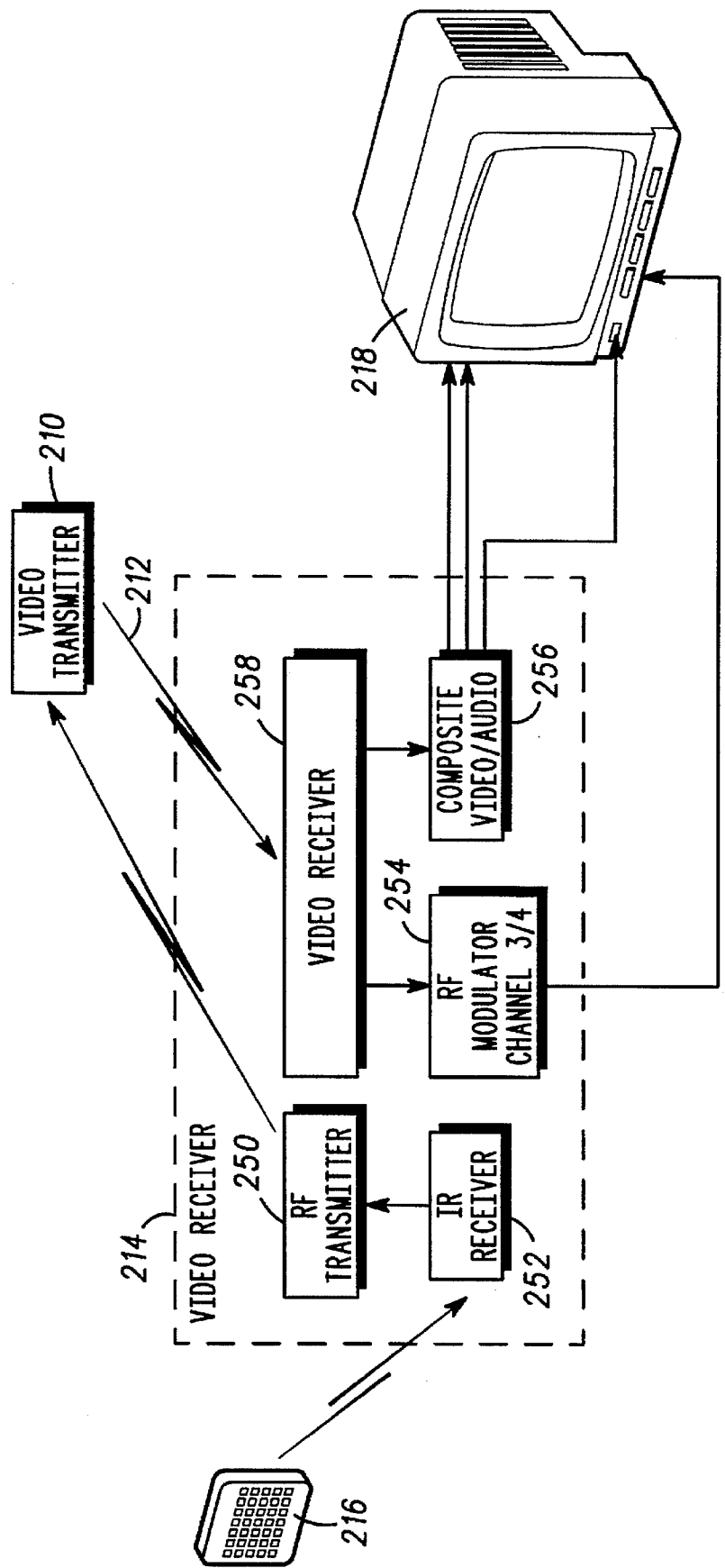
FIG. 7 presents a block diagram representation of a wireless video receiver in accordance with an additional embodiment of the present invention.

FIG. 7 presents a block diagram representation of a wireless video receiver in accordance with an additional embodiment of the present invention. Wireless video receiver 214 includes an RF transmitter 250 responsive to control signals generated by universal remote 216 and received by IR receiver 252. The video signal from wireless video transmitter 210 and wireless link 212 is received by video receiver 258. The video signal is modulated to channel 3 or 4 by RF modulator 254 for input to TV 218 via a tuner input. Alternatively, a composite video signal and accompanying audio signal are separated by video/audio signal generator 256 for transfer to TV 218 configured as a "monitor" with direct video and audio inputs.

Figure 8:
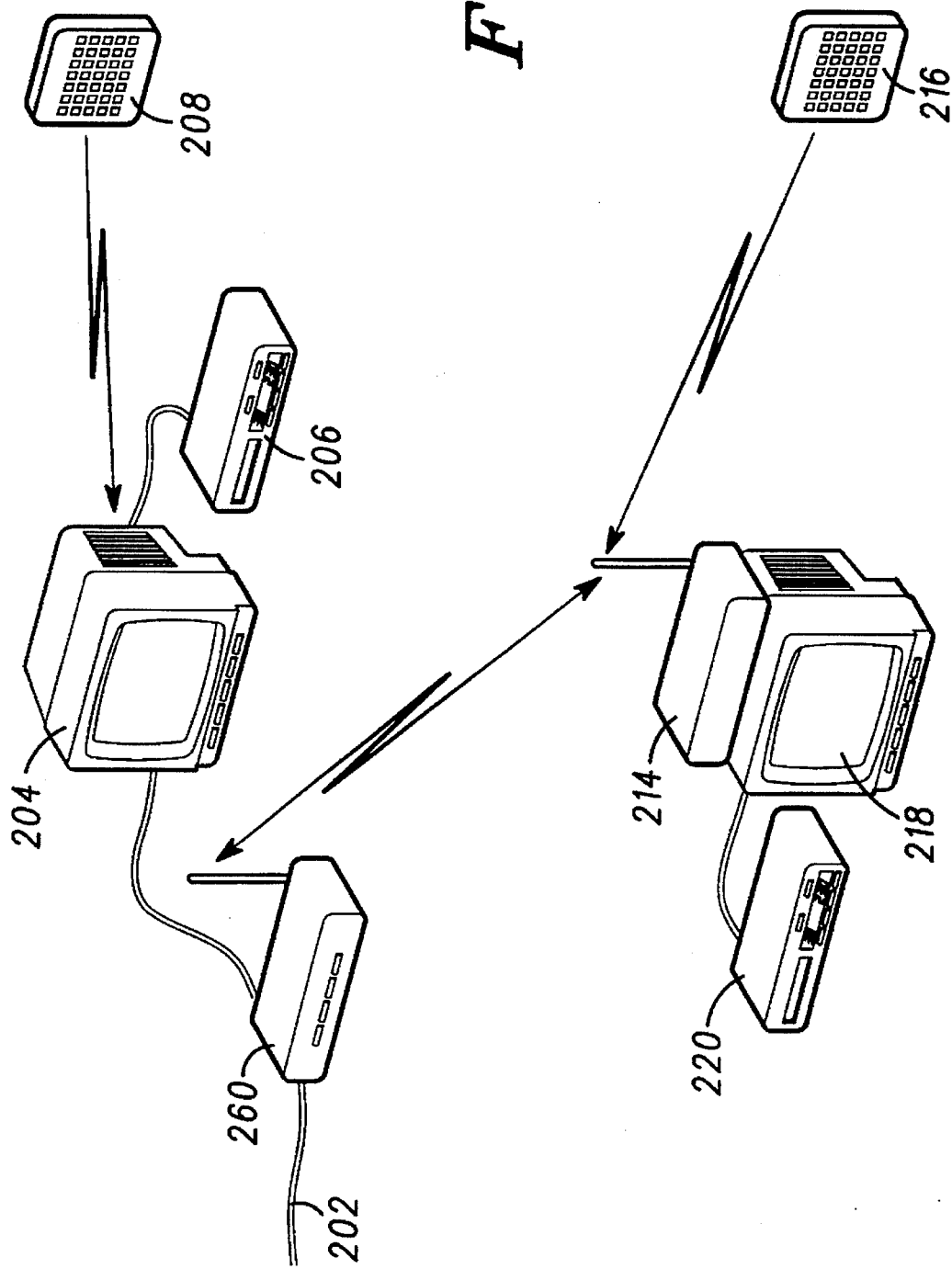
FIG. 8 also presents a block diagram of a video distribution system in accordance with an embodiment of the present invention.

FIG. 8 also presents a block diagram of a video distribution system in accordance with an embodiment of the present invention. In this embodiment, the functions or set-top box 200 and wireless video transmitter 210 have been combined into a single unit—wireless video transmitter 260. This configuration eliminates the need for two separate units.

Thus, there has been described herein a concept, as well as several embodiments including preferred embodiments of a universal multimedia access apparatus.

Because the various embodiments of the universal multimedia access apparatus utilize plug-and-play application-specific modules, each apparatus can provide its respective application-specific communications independent of other devices and applications. As a result, a scalable and distributed network of universal multimedia access devices can be provided. The universal multimedia access apparatus can be utilized to send and/or receive telephone communications, data communications, image/video communications, and control communications. Other applications include remote control functions and multimedia personal digital assistant functions.

It will be apparent to those skilled in the art that the disclosed invention may be modified in numerous ways and may assume many embodiments other that the preferred form specifically set out and described above.

Accordingly, it is intended by the appended claims to cover all modifications of the invention which fall within the true spirit and scope of the invention.

What is claimed is:

1. A universal multimedia access apparatus for use with multimedia applications provided by a multimedia network, the universal multimedia access apparatus comprising:

a first application specific module including a first interface and a second interface associated with an application specific device, the first application specific module associated with a first multimedia application;

an application independent module detachedly coupled to the first application specific module via the first interface, the application independent module comprising:

a transceiver to communicate multimedia information between the multimedia network and the first application-specific module; and a processing unit in communication with the transceiver and the first application-specific module, the processing unit operative to identify the first application-specific module and the first multimedia application associated with the first application-specific module after the first application specific module is coupled to the application independent module, and operative to command the transceiver to communicate with the multimedia network in a mode associated with the first multimedia application.

2. The universal multimedia access apparatus of claim 1 wherein the first application-specific module includes an application-specific transceiver for communicating the multimedia information with the application specific device and wherein the application independent module is connected to a second application specific module.

3. The universal multimedia access apparatus of claim 1 wherein the multimedia information includes at least one of audio signals, image signals, data signals, and control signals.

4. The universal multimedia access apparatus of claim 1 wherein the first application-specific module comprises a telephone application-specific module and the application specific device comprises a telephone.

5. The universal multimedia access apparatus of claim 1 wherein the first application-specific module includes a data application-specific module and the application specific device comprises a computer.

6. The universal multimedia access apparatus of claim 1 wherein the first and a second application-specific module includes an image application-specific module and the application specific device is selected from the group consisting essentially of a camera, a video playback device, a video recording device, and a video display device the application specific device communicating image signals with the multimedia network.

7. The universal multimedia access apparatus of claim 1 wherein the first application-specific module includes a control application-specific module for communicating control signals with the multimedia network.

8. The universal multimedia access apparatus of claim 1 wherein the first and a second application-specific module are different applications selected from the group that includes a telephone application-specific module which interfaces with a telephone for providing a phone service via the multimedia network, a data application-specific module which interfaces with a computer for communicating data with the multimedia network, an image application-specific module which interfaces with at least one of a camera, a video playback device, a video recording device, and a video display device for communicating image signals with the multimedia network, and a control application-specific module for communicating control signals with the multimedia network.

9. The universal multimedia access apparatus of claim 1 wherein the first application specific module is in wireless communication with a second application specific device.

10. The universal multimedia access apparatus of claim 1 wherein the processing unit includes a microprocessor and a plurality of memory devices coupled thereto by a data and control bus, the plurality of memory devices including a read-only memory for storing an operating program and utilities accessed by the microprocessor, a random-access memory for storing session data, and an electrically erasable programmable read-only memory for storing data over a plurality of sessions.

11. The universal multimedia access apparatus of claim 10 wherein the first application-specific module is interfaced thereto via the data and control bus.

12. The universal multimedia access apparatus of claim 1 wherein the transceiver includes a wireless modem for communicating the multimedia information with the multimedia network.

13. The universal multimedia access apparatus of claim 1 wherein the transceiver includes a radio frequency cable modem for communicating the multimedia information with the multimedia network.

14. A multimedia system comprising:

a first universal multimedia access device comprising a first application specific module, a first application independent module, a first application specific transceiver and a second application specific transceiver, the universal multimedia access device in communication with a multimedia network;

a first application device in communication with the universal multimedia access device, the universal multimedia access device communicating with the first application device via the first application specific transceiver; and a second application device in remote communication with the universal multimedia access device, the first universal multimedia access device communicating with the second application device via the second application specific transceiver.

15. The multimedia system of claim 14 wherein the second application specific transceiver comprises a video transmitter.

16. The multimedia system of claim 15 wherein the second application specific transceiver is in communication with the multimedia network.

17. The multimedia system of claim 15 wherein the video transmitter and the video receiver communicate over frequencies selected by a frequency reuse pattern.

18. The multimedia system of claim 16 further comprising a second universal multimedia device in communication with the multimedia network.

19. The multimedia system of claim 14, further comprising a second universal multimedia device in communication with the multimedia network.

20. The multimedia system of claim 19 further comprising a third application device in communication with the second universal multimedia access device.

* * * * *